(12) United States Patent
Kamiya (10) Patent No.: US 7,498,688 B2
(45) Date of Patent: Mar. 3, 2009

(54) ENGINE START CONTROL SYSTEM FOR VEHICLE

(75) Inventor: Hodaka Kamiya, Obu (JP)

(73) Assignee: DENSO CORPORATION, Kariya (JP)

( * ) Notice: Subject to any disclaimer, the term of this patent is extended or adjusted under 35 U.S.C. 154(b) by 519 days.

(21) Appl. No.: 11/220,525

(22) Filed: Sep. 8, 2005

(65) Prior Publication Data
US 2006/0076834 A1    Apr. 13, 2006

(30) Foreign Application Priority Data
Sep. 30, 2004 (JP) ............................. 2004-287725

(51) Int. Cl.
*B60R 25/00* (2006.01)
(52) U.S. Cl. .................................... 307/10.2
(58) Field of Classification Search ................ 307/10.6, 307/10.2
See application file for complete search history.

(56) References Cited

U.S. PATENT DOCUMENTS 7,254,466 B2 * 8/2007 Mori et al. .................... 701/1

FOREIGN PATENT DOCUMENTS

| JP | A-7-117624 | 5/1995 |
| JP | A-8-133016 | 5/1996 |
| JP | A-2005-16388 | 1/2005 |

* cited by examiner

*Primary Examiner*—Robert L. Deberadinis
(74) *Attorney, Agent, or Firm*—Posz Law Group, PLC (57) ABSTRACT

An engine start control system includes a key transponder, a steering lock, a driver authorizer, an engine starting switch, a pre-driving operation detector, a first and second steering lock controllers and an engine start controller. The key transponder stores a slave ID code and transmits the slave ID code at a request. The driver authorizer stores a master ID code and determines whether the slave ID code corresponds to the master user ID code. The pre-driving operation detector detects a driver's preparatory operation to start the engine. The first steering lock controller permits the steering lock to be unlocked when the driver authorizer determines that the slave ID code corresponds to the master ID code. The second steering lock controller unlocks the steering lock when the pre-driving operation detector detects the driver's preparatory operation. The engine start controller permits the engine to be started when the steering lock is unlocked.

4 Claims, 6 Drawing Sheets

ENGINE START CONTROL SYSTEM FOR VEHICLE

CROSS REFERENCE TO RELATED APPLICATION

This application is based upon and claims the benefit of priority of Japanese Patent Application No. 2004-287725 filed on Sep. 30, 2004, the content of which is incorporated herein by reference.

FIELD OF THE INVENTION

The present invention relates to an engine start control system for a vehicle, and particularly to the engine start control system provided with an immobilizer function.

BACKGROUND OF THE INVENTION

There is proposed an engine start control system that allows an engine start in accordance with a collation result of a master ID code stored in a vehicle and a slave ID code stored in a vehicle key fob or in a key transponder (refer to JP-08-133016-A, for example). The engine start control system is generally designated as an immobilizer system.

When the engine start control system does not authorize the slave ID code, the system executes a starter locking procedure, that is, sets an engine control unit in a starter locked state to prevent unauthorized person from starting an engine. An immobilizer control unit, which is separated from the engine control unit, performs the engine start lock procedure. The engine control unit performs an engine start control in accordance with an immobilizer set state signal or an immobilizer released state signal transmitted from the immobilizer control unit. When the engine start control system authorizes the slave ID code, the system executes a starter unlocking procedure, that is, sets an engine control unit in a starter unlocked state to allow a driver to start the engine.

Most immobilizer systems in actual use include steering lock and unlock procedures to lock and unlock a steering lock to improve a security. In the immobilizer system with the steering lock and unlock procedures, it is necessary to prevent the engine from starting before the steering lock is unlocked. Thus, when the system authorizes the slave ID code, the system unlocks the steering lock, and then releases the immobilizer system to allow the engine start.

In a conventional engine start control system, a starter switch of an engine is operated by turning a key inserted in a key cylinder located at a side of a steering shaft. Most recent vehicles are provided with the steering lock installed in the key cylinder. The steering lock is released in a rotational stroke of the starter switch from a lock position (OFF position) to an engine starting position. Conventional immobilizer systems are developed based on this engine start control system. That is, a transponder installed in a key fob memorizes the slave ID code, and a radio frequency (RF) circuit installed in the key cylinder reads the slave ID code. When the slave ID code is authorized, the immobilizer system allows a turn operation of the key inserted in the key cylinder to unlock the steering lock and then to start the engine. From a viewpoint of an internal processing by a computer in the immobilizer system, the immobilizer is released on a condition that the steeling lock is unlocked, and then the engine is started by turning the key up to the engine starting position. An operation of the engine start control system having the above-mentioned structure of the immobilizer is as same as that of a normal engine start control system having no immobilizer system to a driver's operation, except for a case that the slave ID code is not authorized. Thus, the driver can start the engine without feeling odd in the operation. This feature is derived from a manually operable mechanism of the steering lock associated with a turn operation of the starter switch.

Current vehicles have engine start control systems with no manual key operation. For instance, in the engine start control system generally designated as a smart key and push button start system, a wireless communication between a key transponder carried by the driver and a transmission and reception unit mounted on the vehicle proceeds with an unlocking procedure of a door lock, an authorization procedure of the slave ID code, and so on. Specifically, when the driver rides on the vehicle and steps on a brake pedal or a clutch pedal, the engine is started by pressing an engine starting switch while the brake pedal (in a vehicle with automatic transmission) or the clutch pedal (in a vehicle with a manual transmission) is stepped on. In this engine start control system, no manual key operation is associated with the engine starting procedure. Thus, the steering lock is also computerized and operated automatically in control procedures of the immobilizer system.

As a result, the procedure to release the immobilizer system is as follows. When the driver steps on the brake pedal, a wireless communication between the key transponder and the immobilizer system executes an authorization process of the slave ID code stored in the key transponder. Then, in a state that the slave ID code is authorized, when the driver presses the engine starting switch, the immobilizer system unlocks the steering lock, releases the immobilizer system, and then starts the engine. In this engine start control system, however, the steering unlock procedure with mechanical motion is processed between the driver's operation of the engine starting switch and an actual engine start, so that the driver feels odd because the engine does not start rapidly, that is, because of a relatively long delay from the engine starting operation to the actual engine start.

SUMMARY OF THE INVENTION

The present invention is achieved to solve the above-described issue, and has an object to provide an engine start control system to start an engine by a wireless communication with a key transponder and a driver's operation of an engine starting switch mounted on the vehicle, which is capable of starting an engine rapidly regardless of a time necessary for a steering unlock procedure.

The engine start control system includes a key transponder, a steering lock, a driver authorizer, an engine starting switch, a pre-driving operation detector, a first and second steering lock controllers and an engine start controller. The key transponder stores a slave ID code and transmits the slave ID code at a request. The driver authorizer stores a master ID code and determines whether the slave ID code corresponds to the master user ID code. The pre-driving operation detector detects a driver's preparatory operation to start the engine. The first steering lock controller permits the steering lock to be unlocked when the driver authorizer determines that the slave ID code corresponds to the master ID code. The second steering lock controller unlocks the steering lock when the pre-driving operation detector detects the driver's preparatory operation. The engine start controller permits the engine to be started when the steering lock is unlocked.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
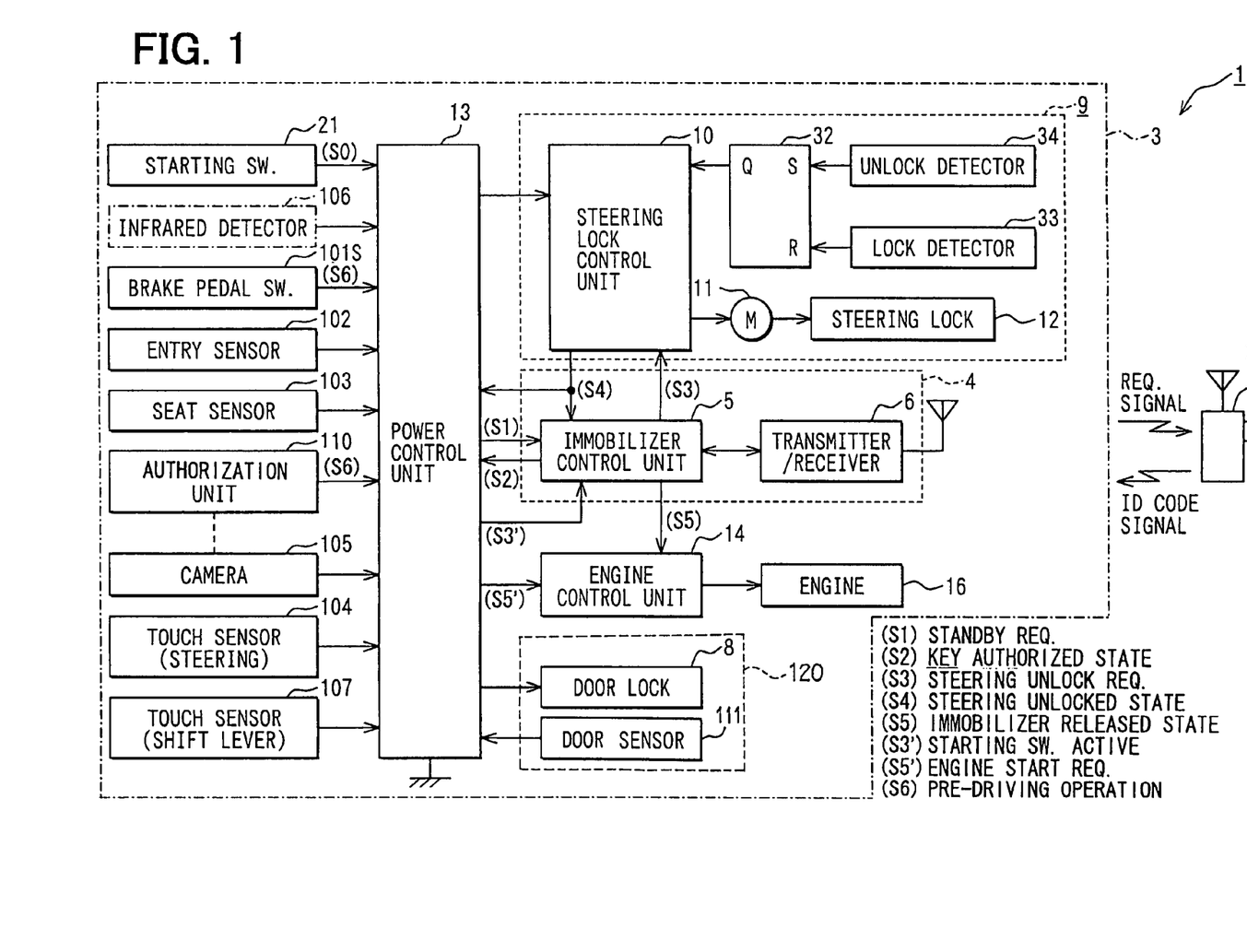
FIG. 1 is a block diagram of an engine start control system according to an embodiment of the present invention.

FIG. 1 schematically depicts an electrical structure of the engine start control system 1. The engine start control system 1 includes a key transponder (a smart key or a security key) 2 carried by a driver and an engine start controller 4 mounted on a vehicle 3. The engine start controller 4 is provided with an immobilizer control unit 5 and a transmission and reception unit 6. The immobilizer control unit 5 controls the transmission and reception unit 6 to transmit a request signal intermittently in a detecting zone in and around the vehicle 3. The key transponder 2 receives the request signal in the detecting zone, and then automatically transmits a slave user ID code stored therein to the transmission and reception unit 6. The vehicle 3 is provided with a power control unit 13 and an engine control unit 14, which are electrically connected to each other. The engine control unit 14 is for controlling fuel injections and ignitions of an engine 16.

Figure 2:
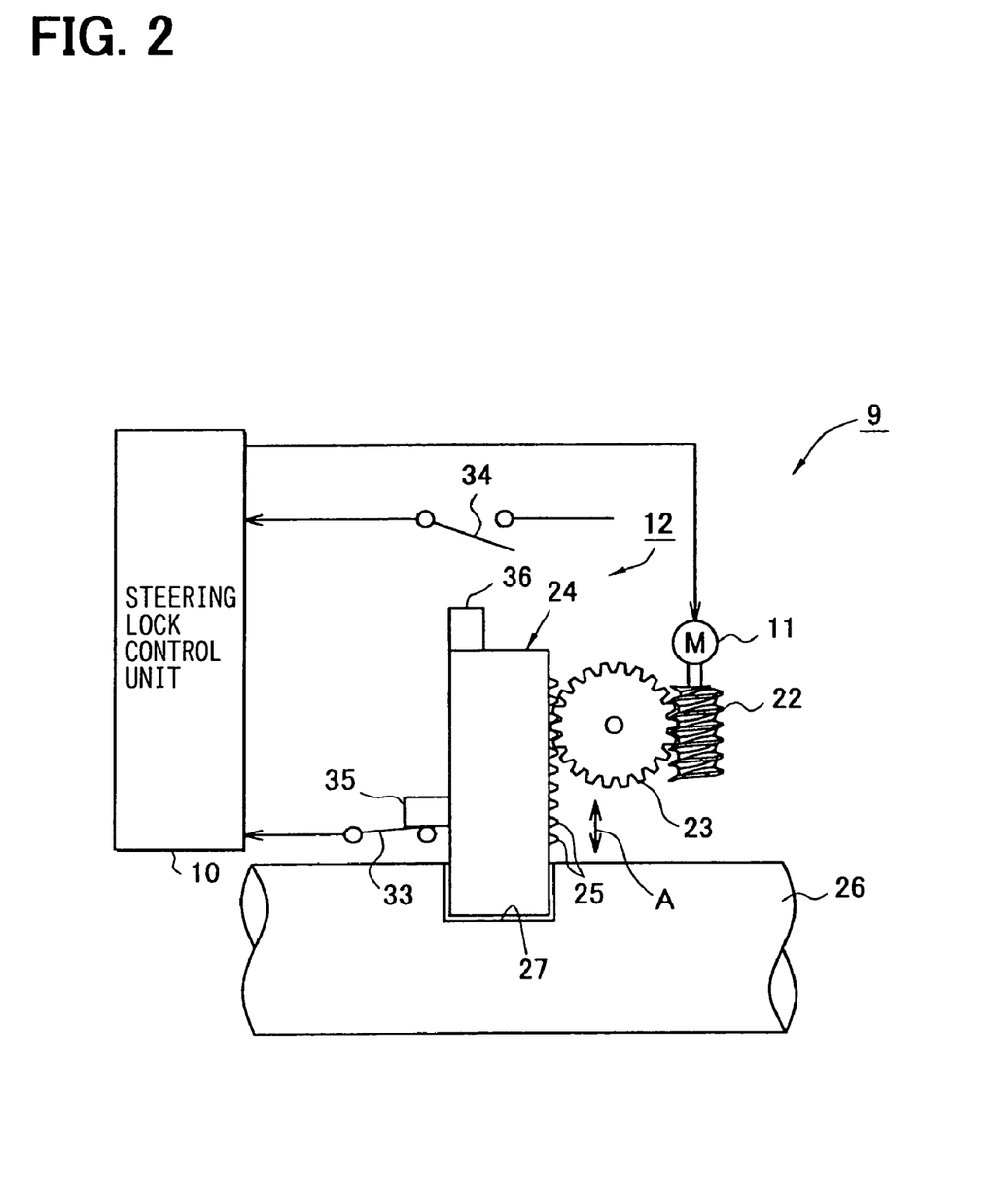
FIG. 2 is a schematic diagram showing an example of a steering lock mechanism of the engine start control system according to the embodiment.

A steering lock apparatus 9 is mounted on the vehicle 3. The steering lock apparatus 9 is provided with a steering lock control unit 10, a steering lock motor 11 as an actuator, and a steering lock 12. FIG. 2 schematically depicts a structure of the steering lock apparatus 9. On an output shaft of the steering lock motor 11 is fixed a worm gear 22. A pinion 23 is meshed with the worm gear 22 and a rack portion 25 provided on a side face of a lock pin 24. By driving the steering lock motor 11, the lock pin 24 moves in an axial direction thereof (in a direction "A" in FIG. 2) to put the leading end of the lock pin 24 into and out of an engagement with an engaging depression 27 formed on a side face of a steering shaft 26.

When the steering lock motor 11 drives in a positive rotational direction to push the lock pin 24 into the engaging depression 27, the steering lock 12 is locked to prevent the steering shaft 26 from a rotational motion. When the steering lock motor 11 drives in a negative rotational direction to pull the lock pin 24 out of the engaging depression 27, the steering lock 12 is unlocked to allow the rotational motion of the steering shaft 26.

The steering lock 12 is provided with a lock detection switch 33 and an unlock detection switch 34. The detection switches 33, 34 are respectively mechanical limit switches. The lock detection switch 33 detects a locked state of the steering lock 12, and the unlock detection switch 34 detects an unlocked state of the steering lock 12. When the steering lock 12 is locked, a contact portion 35 comes in contact with and turns on the lock detection switch 33, and then transmits an ON signal to the steering lock control unit 10. When the steering lock 12 is unlocked, a contact portion 36 provided at a base end portion of the lock pin 24 comes in contact with and turns on the unlock detection switch 34.

As shown in FIG. 2, a distinction signal of the lock and unlock states of the steering lock 12 has signal levels such that an active signal corresponds to the unlock state and an inactive signal corresponds to the lock state. The distinction signal is inputted into the steering lock control unit 10. In the present embodiment, when both of the lock and unlock detection switches 33, 34 are ON, the distinction signal is active (high level, for example); and when both of the lock and unlock detection switches 33, 34 are OFF, the distinction signal is inactive (low level or grounded, for example). An output of the unlock detection switch 34 is inputted into a set terminal of a latch circuit 32, and an output of the lock detection switch 33 is inputted into a reset terminal of the latch circuit 32. Then, an output of the latch circuit 32 is used as the distinction signal of the lock and unlock states of the steering lock 12. Thus, a reset process puts the distinction signal in the inactive signal corresponding to the lock state, and the steering lock unit 9 determines that the steering lock 12 is in lock until the lock pin 24 is completely pulled out of the steering shaft 26 to push and turn on the unlock detection switch 34.

Figure 3:
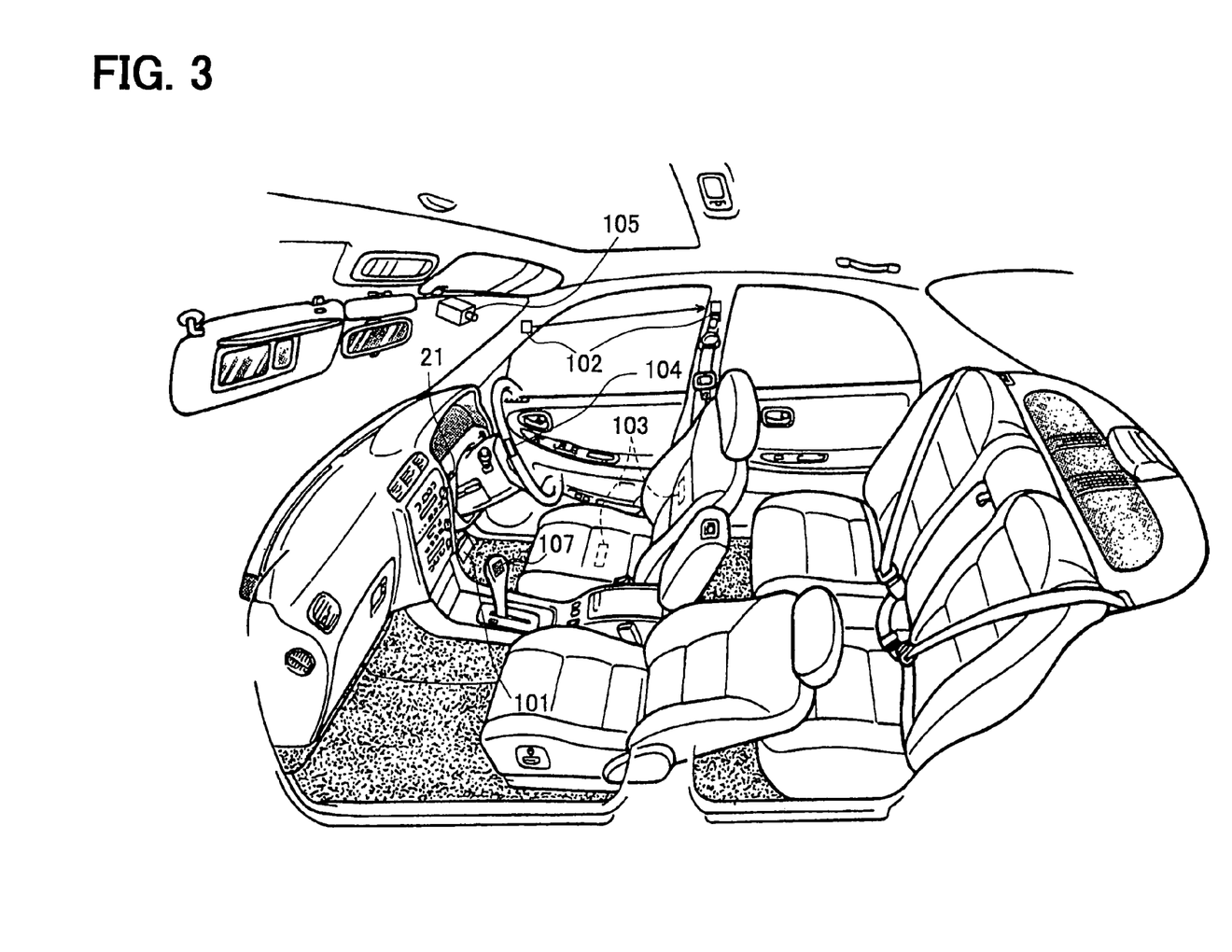
FIG. 3 is a perspective view showing an arranging state of driving intention detector of the engine start control system according to the embodiment.

The vehicle 3 is provided with an engine starting system that starts and stops the engine 16 by pushing an engine starting button switch 21. The engine starting button switch 21 is installed so that a driver can smoothly operate the engine starting button switch 21, for instance, by the side of a console panel as shown in FIG. 3. Alternatively, the engine starting button switch 21 is provided in a portable remote control unit 2 as shown in FIG. 1.

The immobilizer control unit 5, the steering lock control unit 10, the power control unit 13 and the engine control unit 14 are formed from a conventional computer hardware in which a CPU, a ROM, a RAM and an input/output port are in a network interconnection by being connected to a bus.

The components according to the present invention correspond to the hardware in FIGS. 1 and 2 as follows.

The key transponder 2 is separately formed from the vehicle, stores the slave user ID code therein and transmits the slave user ID code at a request.

The steering lock 12 locks and unlocks the steering shaft 26 of the vehicle 3.

The immobilizer control unit 5 serves as the driver authorizer according to the present invention, which stores a master user ID code therein, transmits the request to the key transponder 2, receives the slave user ID code, and determines whether the slave user ID code corresponds to the master ID code.

The steering lock control unit 10 serves as the first steering lock controller according to the present invention, which permits the steering lock 12 to unlock the steering shaft 26 when the immobilizer control unit (driver authorizer) 5 determines that the slave user ID code corresponds to the master user ID code.

The power control unit 13 and the immobilizer control unit 5 cooperatively serve as the second steering lock controller according to the present invention, which lets the steering lock 12 to unlock the steering shaft 26 when the brake pedal switch 101S (pre-driving operation detector) detects the step operation of the brake pedal 101 (driver's preparatory operation) before the driver turns on the engine starting switch 21.

The immobilizer control unit 5 further serves as the first engine start control unit of the engine start controller according to the present invention, which generates any one of an immobilizer released state signal S5 and an immobilizer set state signal.

The immobilizer control unit 5 still further serves as the second engine start control unit of the engine start controller according to the present invention, which switches the immobilizer control unit (first engine control unit) 5 from generating the immobilizer set state signal to generating the immobilizer released state signal S5 when the steering lock 12 is unlocked.

The power control unit 13 and the engine control unit 14 cooperatively serve as the third engine start control unit of the engine start controller according to the present invention, which starts the engine 16 when the engine starting switch 21 is operated while the immobilizer control unit (first engine control unit) 5 generates the immobilizer released state signal S5.

The immobilizer control unit 5 receives the slave user ID code, which is transmitted from the key transponder 2, via the transmission and reception unit 6, then collates the slave user ID code with the master user ID code, which is registered in advance and stored in a collation memory in an EEPROM located in the immobilizer control unit 5. When the immobilizer control unit 5 determines that the slave user ID code corresponds to the master user ID code, the immobilizer control unit 5 unlocks a door lock 8 by actuating a door locking motor. That is, when the detecting zone around the vehicle identifies a presence of the key transponder 2, the immobilizer control unit 5 keeps the door lock 8 unlocked. When the detecting zone identifies an absence of the key transponder 2, the immobilizer control unit 5 keeps the door lock 8 locked. It is useful to improve a security of the vehicle by updating the master user ID code by a random number processing and the like every time the immobilizer control unit 5 executes the collation process. In this case, the slave user ID code in the key transponder 2 is also updated by a wireless communication with the transmission and reception unit 6.

Figure 4:
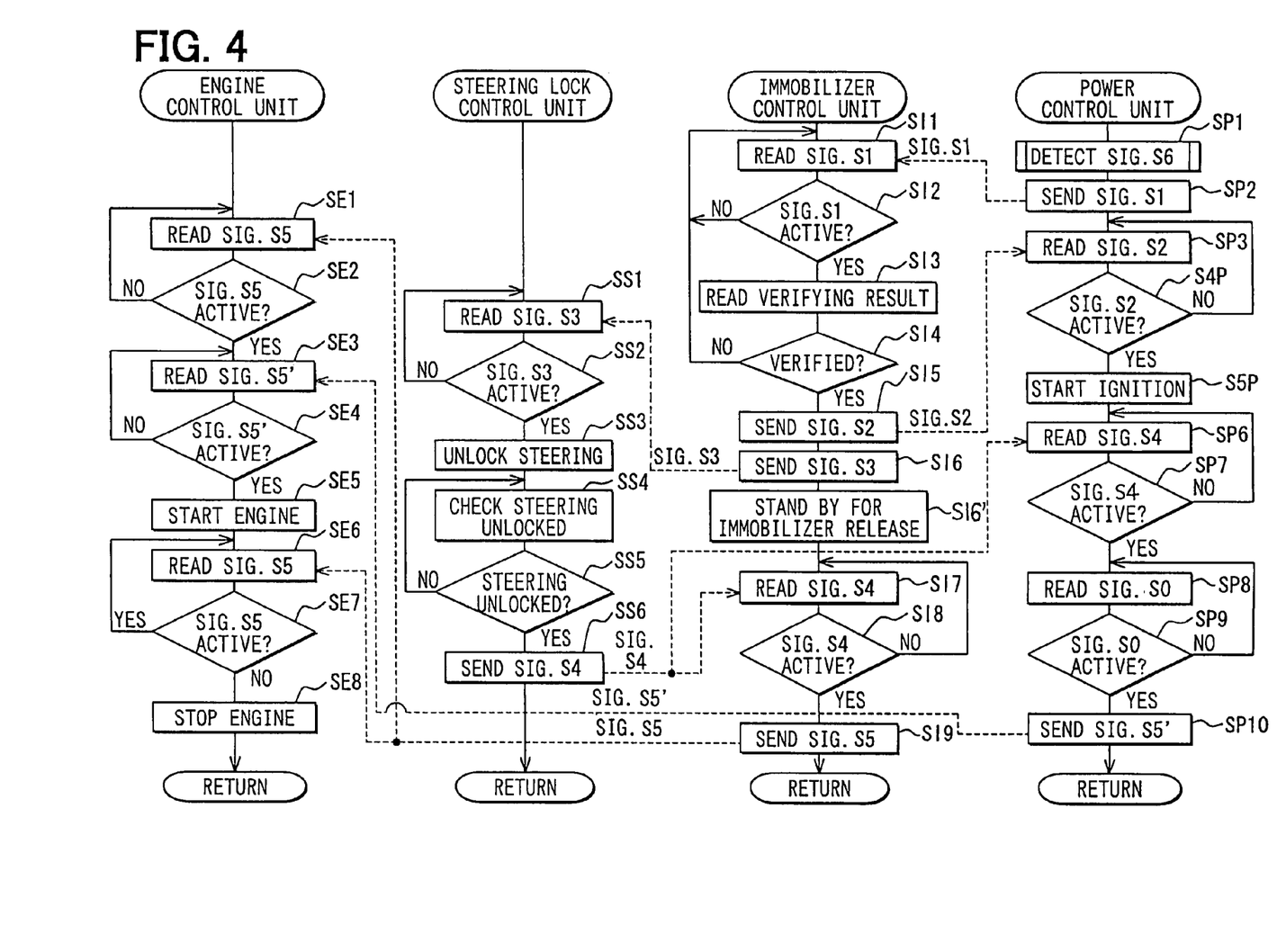
FIG. 4 is a flow chart showing a signal transmission control routine executed by the engine start control system according to the embodiment.

A control procedure by the engine start control system 1 will be described in the following in connection with a relevant principal process shown in FIG. 4 and a timing chart of data transmission shown in FIG. 5. In the following description, signal transmissions are executed by changing signal levels thereof. For instance, "a signal is transmitted from a transmitter" means "a signal level of the signal that is sent from a transmission port of a transmitter is set active". When the signal level of the signal out of the transmission port is active, a receiver can access the signal out of the transmission port and receive the signal.

The entire process by the engine start control system 1 begins at a pre-driving operation detection process. Specifically, when a driver seats on a drivers seat and steps on a brake pedal 101 before operating the engine starting switch 21, a brake pedal switch 101S transmits a braking signal (pre-driving operation detection signal) S6 to the power control unit 13, and the power control unit 13 receives the braking signal S6 in step SP1. Then, the power control unit 13 transmits a standby request signal S1 to the immobilizer control unit 5 in step SP2.

The immobilizer control unit 5 receives the standby request signal S1 in steps SI1 and SI2. The immobilizer control unit 5 requests a key transponder 2 to transmit the slave user ID code, receives the slave user ID code and collates the slave user ID code with the master user ID code in steps SI3 and SI4. If the immobilizer control unit 5 determines that the slave user ID code corresponds to the master user ID code, that is, when the immobilizer control unit 5 authorizes the key transponder 2 (YES in the step SI4), the immobilizer control unit 5 transmits a collation result signal S2 to the power control unit 13 in step SI5, and transmits a steering unlock request signal S3 to the steering lock control unit 10 in step SI6. If NO in the step SI4, the process goes back to the step SI1.

The steering lock control unit 10 receives the steering unlock request signal S3 in steps SS1 and SS2, then unlocks the steering lock 12 in step SS3. The steering lock control unit 10 determines whether the steering lock is unlocked or not in steps SS4 and SS5. If the steering lock control unit 10 determines that the steering lock is unlocked (YES in the step SS5), the steering lock controller 10 transmits a steering unlocked state signal S4 to the immobilizer control unit 5 and to the power control unit 13 in step SS6. Then, the power control unit 13 receives a collation result signal S2, and activates the engine starting switch 21. The immobilizer control unit 5 receives the steering unlocked state signal S4 in steps SI7 and SI8. When the steering unlocked state signal S4 is active, the immobilizer control unit 5 transmits an immobilizer release state signal S5 to the engine control unit 14. When the immobilizer release state signal S5 is active, the engine control unit 14 permits the engine 16 to be started, and when the signal S5 is inactive, the engine control unit 14 prohibits the engine 16 from being started.

As apparent from the above-described procedure, a release of the steering lock 12 is done in the step SS3 after the driver steps on the brake pedal 101 (refer to FIG. 3) in the step SP1 and before the driver presses the engine starting switch 21. The power control unit 13 receives the steering unlocked state signal S4 in steps SP6 and SP7 then is put on standby for an engine starting signal S0. In this state, when the engine starting switch is pressed, the power control unit 13 transmits an engine start request signal S5' to the engine control unit 14 in step SP10. The engine control unit 14 monitors the immobilizer released state signal S5, and remains in an idle state until the immobilizer state signal S5 becomes active in steps SE1 and SE2. If the engine control unit 14 determines that the immobilizer released state signal S5 is active (YES in step SE2), the engine control unit 14 receives the engine start request signal S5' in steps SE3 and SE4. If the engine control unit 14 determines that the engine start request signal S5' is active (YES in the step SE4), that is, when a condition for starting the engine 16 is satisfied, the engine control unit 14 starts the engine 16 in step SE5. After starting the engine 16, the engine control unit 14 keeps on monitoring the immobilizer released state signal S5.

Figure 5:
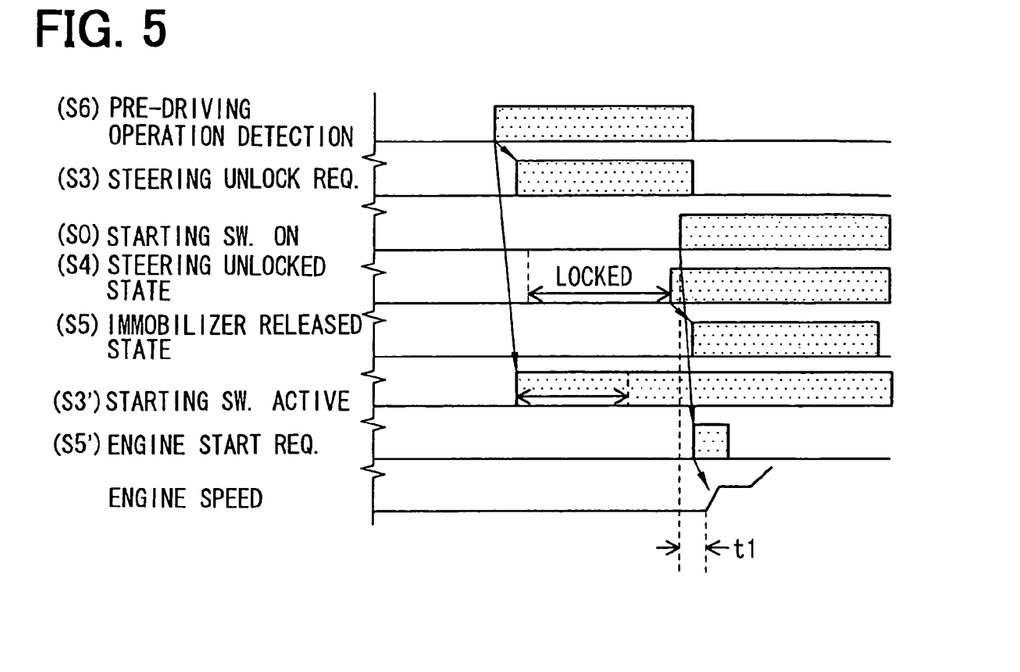
FIG. 5 is a timing chart of signal transmission in accordance with the data transmission control routine shown in FIG. 4
Figure 6:
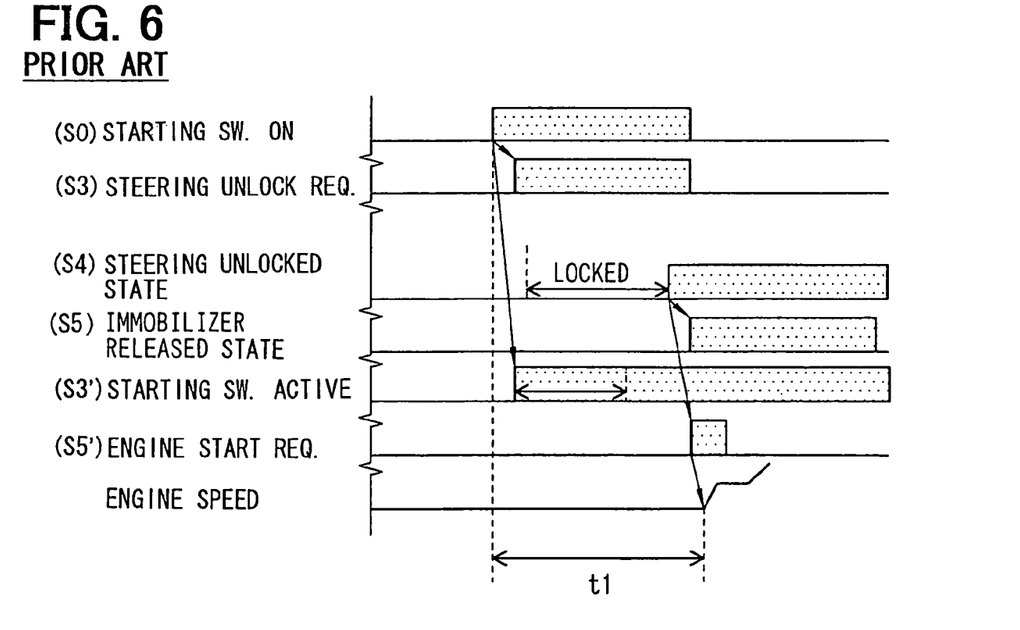
FIG. 6 is a timing chart of signal transmission by a conventional engine start control system.

As shown in FIG. 5, the engine start request signal S5' is transmitted to the engine control unit 14, the steering lock 8 is already unlocked in the step SS3, so that the engine 16 starts rapidly just after the pressing operation of the engine starting switch 21. That is, a delay t1 from the pressing operation of the engine starting switch 21 to the engine start is relatively short. Contrastively, in conventional art shown in FIG. 6, when the engine starting switch 21 is pressed, the engine start request signal S5' is generated, but the engine start signal S5' is transmitted after the steering lock 12 is unlocked. Thus, the delay t1 from the pressing operation of the engine starting switch 21 to the engine start is relatively long.

In the process shown in FIG. 5, the immobilizer control unit 5 executes immobilizer releasing steps SI1 to SI9 before the engine starting switch 21 is pressed. Alternatively, the immobilizer control unit 5 may be configured to execute the immobilizer releasing steps after receiving the engine start request signal S5'. An internal processing by the computer hardware completes the immobilizer releasing steps SI1 to SI9 in a relatively short time, so that the above-mentioned alternative configuration hardly extends the delay t1 from the turning-on of the engine starting switch 21 to the start of the engine 16.

It is useful to employ the pedal switch 101S for the pre-driving operation detector according to the present invention, because a vehicle 3 with automatic transmission employs the pedal switch 101S for a standard condition to start an engine 16.

The procedural order of the engine start control system 1 is a detection of the braking signal S6 (step SP1), a release of the steering 12 (step SS3), an operation of the engine starting switch (step SP10) and an engine start (step SE5). The procedural order provides an advantage of the engine start control system 1 to shorten the delay t1. It is also an advantage that the design of the engine start control system 1 is easy because the procedural order is derived just by interchanging a conventional procedural order, which is a detection of the braking signal, an operation of the engine starting switch, a release of the steering and an engine start. Thus, a manufacturing cost of the engine start control system 1 can be limited.

Further, the engine start control system 1 employs the braking signal S6 for the pre-driving operation detector, so that the system 1 can start the engine 16 rapidly without letting the engine 16 be erroneously started by a proximate presence of the key transponder 2 outside the vehicle 3.

Instead of the brake pedal switch 101S of the brake pedal 101 (refer to FIG. 1), other devices identifying the driver's pre-driving operation can serve as the pre-driving operation detector. For example, a door sensor 111, which detects an opening and closing state of a driver's seat's door 120, can serve as the pre-driving operation detector. As shown in FIG. 1, the door sensor 111 operates while the door is open at a predetermined angle or more, and is used for turning on and off a room lamp and so on.

An entry sensor, which detects an entry of a driver into the vehicle, may also serve as the pre-driving operation detector. As example of the entry sensor, FIG. 3 depicts a transmission light detector 102 installed on both sides of the driver's seat's door 120. A camera 105 can serve as the entry sensor instead of the transmission light detector 102.

The vehicle 3 may be provided with a touch sensor 104 installed on a steering wheel and/or a touch sensor 107 installed on a shift lever of the vehicle 3 to serve as the pre-driving operation detector(s). A seat sensor 103 installed in the driver's seat may serve as the pre-driving operation detector.

In a case that the engine starting switch 21 is fixed in the vehicle 3, the engine starting switch 21 may be provided with a finger detection sensor 106 such as an infrared detector or a long-range proximity sensor to serve as the pre-driving operation detector.

Figure 7:
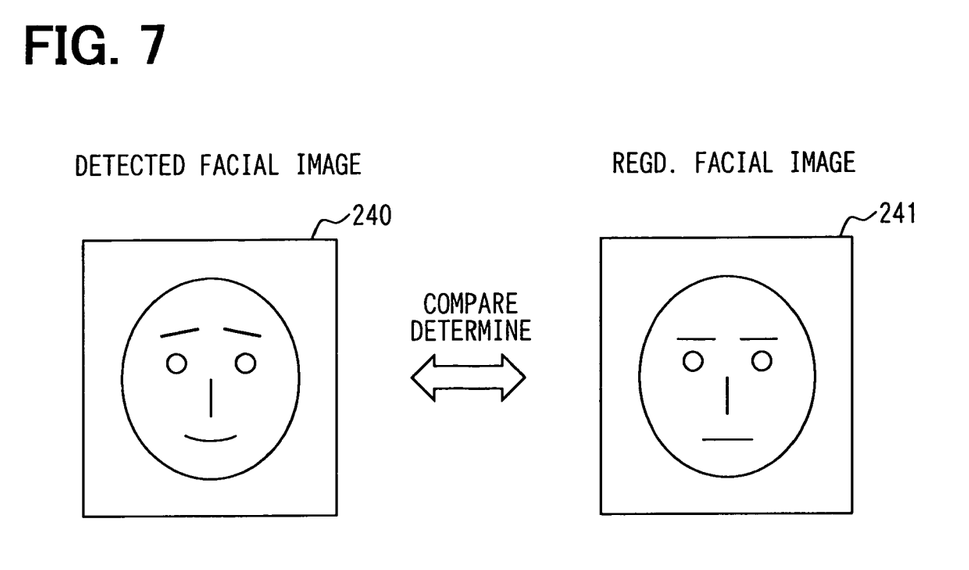
FIG. 7 is a schematic diagram showing facial images of a driver detected and registered by an image recognition system serving as the driving intention detector of the engine start control system according to the embodiment.

As shown in FIG. 1, in a case that the vehicle 3 is provided with a life identification system 110 for authorizing a registered driver, the life identification system may transmit the pre-driving operation detection signal in authorizing the registered driver to serve as the pre-driving operation detector. A specific life identification method of the life identification system 110 may be conventional ones. For example, as shown in FIG. 7, a driver's face is stored as a master facial image data 241 in the life identification system 110 in advance. When a driver seats on a driver's seat, a camera 105 takes the driver's facial image data 240 and the life identification system collates the driver's facial image data 240 with the master facial image data 241, and then determines whether the driver's facial image data 240 corresponds to the master facial image data 241 or not. If the life identification system determines the driver's facial image data 240 corresponds to the master facial image data 241, the life identification system transmits an authorization signal to the power control unit 13 as the pre-driving operation detection signal in FIG. 5. Alternatively, the life identification system may use a fingerprint, an iris, a retina pattern, a voice wave and the like instead of the facial image to identify the registered driver.

Further, the above-mentioned pre-driving operation detectors may be applied in a combined use accordingly. In FIG. 1 are shown the pre-driving operation detectors, which are applicable for eclectic use.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine start control system for a vehicle comprising:
    a key transponder separately formed from the vehicle, storing a slave user ID code therein and for transmitting the slave user ID code at a request;
    a steering lock for locking and unlocking a steering shaft of the vehicle;
    a driver authorizer storing a master user ID code therein, for transmitting the request to the key transponder, for receiving the slave user ID code, and for determining whether the slave user ID code corresponds to the master user ID code or not;
    an engine starting switch for starting an engine of the vehicle;
    a pre-driving operation detector for detecting at least one driver's preparatory operation to start the engine before an operation of the engine starting switch;
    a first steering lock controller which permits the steering lock to unlock the steering shaft when the driver authorizer determines that the slave user ID code corresponds to the master user ID code;
    a second steering lock controller which lets the steering lock to unlock the steering shaft when the pre-driving operation detector detects the driver's preparatory operation before the driver turns on the engine starting switch; and
    an engine start controller which permits the engine to be started when the steering lock is unlocked and prohibits the engine from being started when the steering lock is locked,
    wherein the driver authorizer determines that the slave user ID code corresponds to the master user ID code on a condition that the pre-driving operation detector detects the driver's preparatory operation.

2. The engine start control system according to claim 1, wherein the engine start controller is provided with:
    a first engine start control unit which generates any one of an immobilizer released state signal and an immobilizer set state signal;
    a second engine start control unit which switches the first engine control unit from generating the immobilizer set state signal to generating the immobilizer released state signal when the steering lock is unlocked; and
    a third engine start control unit which starts the engine when the engine starting switch is operated while the first engine control unit generates the immobilizer released state signal.

3. The engine start control system according to claim 1, wherein the pre-driving operation detector is a brake pedal switch which detects a step operation of a brake pedal of the vehicle.

4. The engine start control system according to claim 3, wherein the engine start controller permits the engine to be started when the engine starting switch is operated while the brake pedal switch detects the step operation.

* * * * *